R. C. STUBBINS.
BANK CHECK, DRAFT, OR LIKE INSTRUMENT.
APPLICATION FILED APR. 17, 1914.
1,174,910.                                              Patented Mar. 7, 1916.
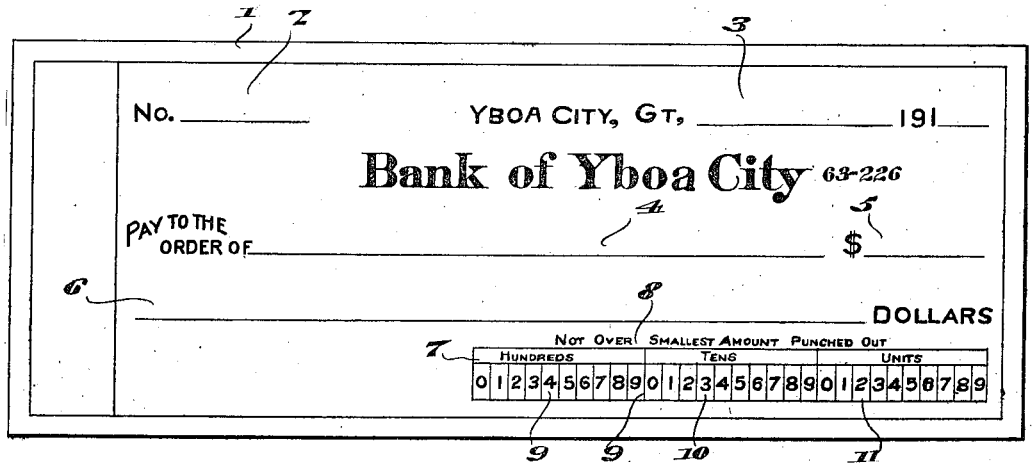
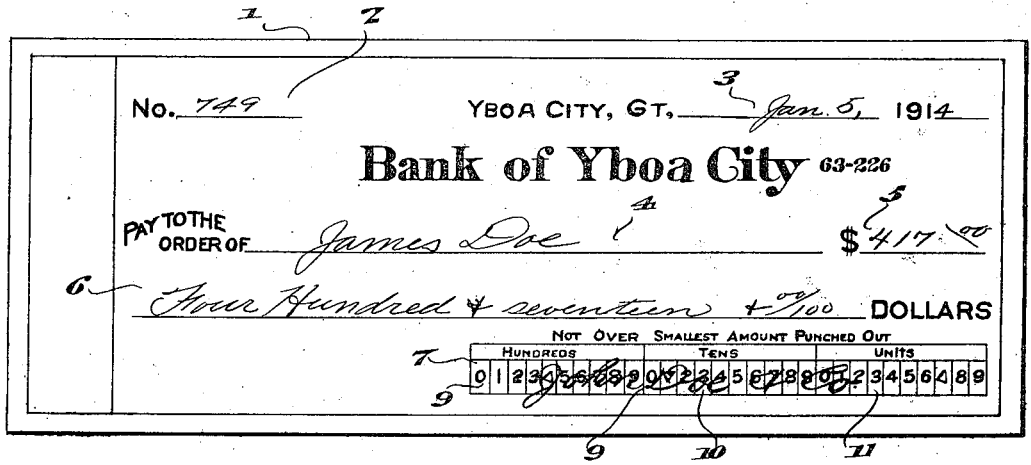
Witnesses
Inventor
Robert C. Stubbins
By Victor J. Evans
Attorney

UNITED STATES PATENT OFFICE.

ROBERT C. STUBBINS, OF TAMPA, FLORIDA.

BANK CHECK, DRAFT, OR LIKE INSTRUMENT.

1,174,910.

Specification of Letters Patent. Patented Mar. 7, 1916.

Application filed April 17, 1914. Serial No. 832,626.

*To all whom it may concern:*

Be it known that I, ROBERT C. STUBBINS, a citizen of the United States, residing at Tampa, in the county of Hillsborough and State of Florida, have invented new and useful Improvements in Bank Checks, Drafts, or like Instruments, of which the following is a specification.

This invention relates to bank checks, drafts and similar instruments, and its object is to provide an instrument of this character with simple and efficient means to prevent the amount for which the check is originally drawn from being raised, and also to prevent the signature of the drawer from being erased or changed.

In the accompanying drawing:—Figure 1 is a plan view of a blank check embodying my invention. Fig. 2 is a similar view showing the check filled out to exemplify its mode of use.

Referring to the drawing, 1 designates a check blank, or like instrument, provided upon its face with the usual order payment form. This may be of any suitable or preferred character. As shown in the present instance, the form contains a suitably designated space 2 for the number of the check or draft, a space 3 for the date, a space 4 for the name of the drawer or name of the party in whose favor the check or draft is drawn, a space 5 for the reception of the amount with which the check is drawn in figures, a space 6 in which the amount is written out, and a signature space 7, arranged at the lower right hand portion of the form, for the reception of the signature of the drawer of the check. In accordance with my invention the space 7 is preferably blocked off by an oblong rectangular marginal line 8 having a plurality of transverse division lines 9, separating the blocked space into amount designating sections 9, 10 and 11 respectively denoting hundreds, tens and units. Each of these sections is appropriately designated and is further divided by longitudinal and transverse lines into a series of smaller spaces or sub-divisions, ten in number in each section, and containing suitable indicia, such as the digits, from 0 to 9, inclusive. The signature block is of sufficient dimensions to enable the signature of the drawer to be inscribed therein and in an appropriate position with relation thereto may appear a suitable statement of information or warning notice, such as "Not over smallest amount punched out".

In the use of the check, the drawer of the check signs his name, or that of his company, within the space 7 and across the figures in the sections 9, 10 and 11. After this is done, an ordinary punch is used to punch out the amount of the check in figures in the said sub-divisions 9, 10 and 11, whereby a portion of the signature itself will also be punched out or obliterated, although not enough, to, in any manner destroy its legibility. For protective purposes, there should always be three punch marks in each check, which may be readily made in the great majority of cases without special understanding or provision. If, however, the check is for a sum less than $10, the zero mark in the hundreds sub-division, and the zero mark in the tens sub-division, may be punched in addition to the single figure in the units sub-division next above the figure denoting the amount of the check. The form of check illustrated is good for any amount up to $1000, but, of course, can be made good up to $10,000 by the use of an additional section for the thousands sub-division. In practice the signature block may be printed or lithographed in the same color as the remainder of the check form, or of a contrasting color, as desired.

The present invention is designed to meet the requirements of the great majority of persons who write checks and have not an easy, simple or effective way of protecting their checks from being raised. The present invention combines the two propositions of protecting the check from alteration as to the amount, as well as to prevent or deter forgery, since obliteration of part of the genuine signature obviates the liability of the signature being erased or changed without detection.

I claim:—

A check, draft, or like instrument having a signature receiving space formed of an oblong rectangular block of restricted size and character, arranged at the lower right hand portion thereof, said block being provided with a consecutive series of main divisions extending in linear order and indicating certain progressive ranges of value, said main divisions being vertically sub-divided into numbered units, tens and hundreds spaces arranged in inverse order from right to left but each having the numbers therein arranged in regular order from left to right and representing certain fractions of values, said block being of a length proportioned to an ordinary signature to require the writing of the signature along a line extending into all three of said main divisions, whereby determined numbered spaces and overlying portions of a superscribed signature written within the respective divisions of the block may be simultaneously punched out.

In testimony whereof I affix my signature in presence of two witnesses.

ROBERT C. STUBBINS.

Witnesses:
EDWIN H. HANEY,
EDWARD E. FISH.